US010102255B2

(12) United States Patent
Jain et al.

(10) Patent No.: US 10,102,255 B2
(45) Date of Patent: Oct. 16, 2018

(54) CATEGORIZING OBJECTS FOR QUERIES ON ONLINE SOCIAL NETWORKS

(71) Applicant: Facebook, Inc., Menlo Park, CA (US)

(72) Inventors: Dinkar Jain, Menlo Park, CA (US); Ashish Gupta, Mountain View, CA (US); Rose Marie Philip, Sunnyvale, CA (US); Rajat Raina, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 211 days.

(21) Appl. No.: 15/260,214

(22) Filed: Sep. 8, 2016

(65) Prior Publication Data

US 2018/0067945 A1    Mar. 8, 2018

(51) Int. Cl.
    *G06F 17/30* (2006.01)
(52) U.S. Cl.
    CPC .... *G06F 17/3053* (2013.01); *G06F 17/30867* (2013.01); *G06F 17/30958* (2013.01)
(58) Field of Classification Search
    CPC .......... G06F 17/3053; G06F 17/30958; G06F 17/30867
    USPC ....................................................... 707/731
    See application file for complete search history.

(56) References Cited

U.S. PATENT DOCUMENTS

| 5,918,014 | A   | 6/1999  | Robinson |            |
|-----------|-----|---------|----------|------------|
| 6,539,232 | B2  | 3/2003  | Hendrey  |            |
| 6,957,184 | B2  | 10/2005 | Schmid   |            |
| 6,963,867 | B2* | 11/2005 | Ford     | G06F 17/30705 |
|           |     |         |          | 707/752    |
| 7,069,308 | B2  | 6/2006  | Abrams   |            |
| 7,379,811 | B2  | 5/2008  | Rasmussen|            |
| 7,409,336 | B2* | 8/2008  | Pak      | G10L 15/1822 |
|           |     |         |          | 704/10     |
| 7,523,099 | B1* | 4/2009  | Egnor    | G06F 17/30707 |
| 7,539,697 | B1  | 5/2009  | Akella   |            |
| 7,752,326 | B2  | 7/2010  | Smit     |            |
| 7,783,630 | B1  | 8/2010  | Chevalier|            |
| 7,797,635 | B1  | 9/2010  | Denise   |            |
| 7,836,044 | B2  | 11/2010 | Kamvar   |            |
| 8,027,990 | B1  | 9/2011  | Mysen    |            |
| 8,055,673 | B2  | 11/2011 | Churchill|            |

(Continued)

OTHER PUBLICATIONS

Schenkel, Ralf, et al., "Efficient Top-k Querying over Social-Tagging Networks", SIGIR '08, Singapore, Jul. 20-24, 2008, pp. 523-530.*

*Primary Examiner* — Robert Stevens
(74) *Attorney, Agent, or Firm* — Baker Botts L.L.P.

(57) ABSTRACT

In one embodiment, a method includes receiving a query inputted by the user; identifying a set of objects matching the query; calculating, for each identified object, a plurality of category-scores corresponding to a plurality of categories, respectively, wherein each category-score is calculated based on a plurality of sub-scores corresponding to a plurality of scoring axes; categorizing each identified object into a category of the plurality of categories based on the category-scores for the identified object; and sending, to the client system in response to the query, one or more search results corresponding to one or more of the categorized objects for display, each search result referencing the respective categorized object, wherein the one or more categorized objects of the search results comprises objects categorized into one or more selected categories.

20 Claims, 9 Drawing Sheets

(56) References Cited

U.S. PATENT DOCUMENTS

| | | |
|---|---|---|
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 * | 7/2014 | Lee ................... G06F 17/30979 707/771 |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,903,810 B2 * | 12/2014 | Ismalon .............. G06F 17/3064 382/159 |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |

(56) References Cited

U.S. PATENT DOCUMENTS

| | | | |
|---|---|---|---|
| 2013/0246404 A1 | 9/2013 | Annau | |
| 2013/0254155 A1 | 9/2013 | Thollot | |
| 2013/0254305 A1 | 9/2013 | Cheng | |
| 2014/0006416 A1 | 1/2014 | Leslie | |
| 2014/0067535 A1 | 3/2014 | Rezaei | |
| 2014/0122465 A1 | 5/2014 | Bilinski | |
| 2014/0188862 A1* | 7/2014 | Campbell | G06F 17/30554 707/728 |
| 2014/0188899 A1* | 7/2014 | Whitnah | G06F 17/30646 707/749 |
| 2014/0222807 A1* | 8/2014 | Lee | G06F 17/3053 707/732 |
| 2014/0222835 A1* | 8/2014 | Lee | G06F 17/30979 707/748 |
| 2014/0280080 A1 | 9/2014 | Solheim | |
| 2014/0304429 A1 | 10/2014 | Softky | |
| 2014/0324851 A1* | 10/2014 | Tholiya | G06F 17/30864 707/731 |
| 2014/0337371 A1* | 11/2014 | Li | G06F 17/30958 707/767 |
| 2014/0344265 A1* | 11/2014 | Boucher | G06F 17/30867 707/732 |
| 2015/0039596 A1* | 2/2015 | Stewart | G06F 17/30867 707/723 |
| 2015/0039597 A1* | 2/2015 | Raina | G06F 17/30 707/723 |
| 2015/0074289 A1 | 3/2015 | Hyman | |
| 2015/0161519 A1 | 6/2015 | Zhong | |
| 2015/0286643 A1 | 10/2015 | Kumar | |
| 2015/0363402 A1 | 12/2015 | Jackson | |
| 2016/0026727 A1 | 1/2016 | Bar-Yossef | |
| 2016/0041982 A1 | 2/2016 | He | |
| 2016/0063093 A1 | 3/2016 | Boucher | |
| 2016/0063115 A1 | 3/2016 | Ayan | |
| 2016/0162502 A1 | 6/2016 | Zhou | |
| 2016/0203238 A1 | 7/2016 | Cherniavskii | |
| 2017/0372337 A1* | 12/2017 | Han | H04L 67/02 |
| 2018/0060822 A1* | 3/2018 | Hou | G06Q 10/1053 |

* cited by examiner

|  | axis_1 | axis_2 | ... | axis_K |
|---|---|---|---|---|
| category_1 | a(1, 1) R(1) | a(2, 1) R(2) |  | a(K, 1) R(K) |
| category_2 | a(1, 2) R(1) | a(2, 2) R(2) | ... | a(K, 2) R(K) |
| category_3 | a(1, 3) R(1) | a(2, 3) R(2) |  | a(K, 3) R(K) |
| ⋮ | ⋮ | ⋮ | ⋱ | ⋮ |
| category_C | a(1, C) R(1) | a(2, C) R(2) | ... | a(K, C) R(K) |

FIG. 4A

|  | recency | social relevance | text similarity | author quality |
|---|---|---|---|---|
| news | 0.2 | 0.4 | 0.1 | 0.3 |
| celebrity | 0.7 | 1.0 | 0.2 | 0.3 |
| how to | 0.4 | 0.7 | 0.3 | 0.6 |
| commentary | 0.0 | 0.4 | 0.8 | 0.1 |

FIG. 4B

|          | category_1 | category_2 | ... | category_C |
|----------|------------|------------|-----|------------|
| object_1 | $S_1(1)$   | $S_1(2)$   |     | $S_1(C)$   |
| object_2 | $S_2(1)$   | $S_2(2)$   | ... | $S_2(C)$   |
| object_3 | $S_3(1)$   | $S_3(2)$   |     | $S_3(C)$   |
| ⋮        | ⋮          | ⋮          | ⋱   | ⋮          |
| object_N | $S_N(1)$   | $S_N(2)$   | ... | $S_N(C)$   |

*FIG. 5A*

|          | news | celebrity | how to | commentary |
|----------|------|-----------|--------|------------|
| object_1 | 0.7  | 0.5       | 0.1    | 0.4        |
| object_2 | 0.9  | 0.1       | 0.1    | 0.1        |
| object_3 | 0.4  | 0.9       | 0.2    | 0.5        |
| object_4 | 0.1  | 0.7       | 0.8    | 0.2        |
| object_5 | 0.5  | 1.0       | 0.4    | 0.2        |
| object_6 | 0.6  | 0.7       | 0.5    | 0.2        |
| object_7 | 0.5  | 0.3       | 0.3    | 0.0        |

*FIG. 5B*

CATEGORIZING OBJECTS FOR QUERIES ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may send to the client system of a user categorized search results in response to a query received from the client system. The social-networking system may identify a set of objects that match a query and calculate, for each object, category-scores corresponding to a plurality of categories (e.g., a news category, a celebrity category, a commentary category, etc.). Each category-score may be calculated based on a plurality of sub-scores corresponding to a plurality of scoring axes, respectively, each scoring axis corresponding to a particular factor (e.g., recency, textual similarity, author quality, etc.). Each category-score may be a weighted arithmetic mean of the sub-scores, where the weighting is based on the category corresponding to the category score. The identified objects may be categorized into one of the plurality of categories based on its category-scores, and the social-networking system may send search results referencing the categorized objects to the client system.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4A illustrates an example set of weighted sub-scores corresponding to an example set of categories for an example identified object.

FIG. 4B illustrates an example set of particular weighted sub-scores corresponding to an example set of particular categories for an example identified object.

FIG. 5A illustrates an example set of category scores for an example set of identified objects.

FIG. 5B illustrates an example set of particular category-scores corresponding to an example set of identified objects.

DESCRIPTION OF EXAMPLE EMBODIMENTS

System Overview

Figure 1:
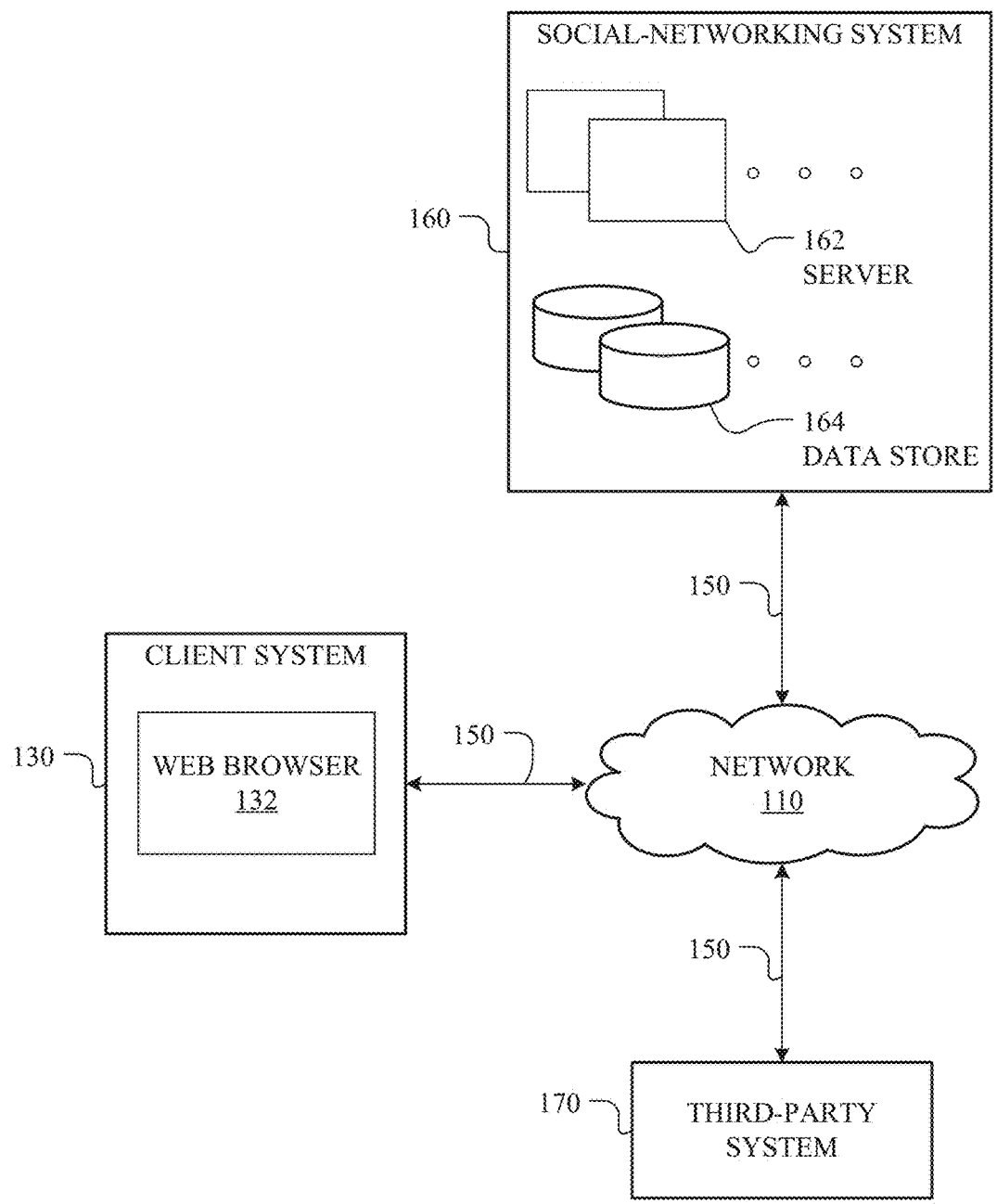
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects.

A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
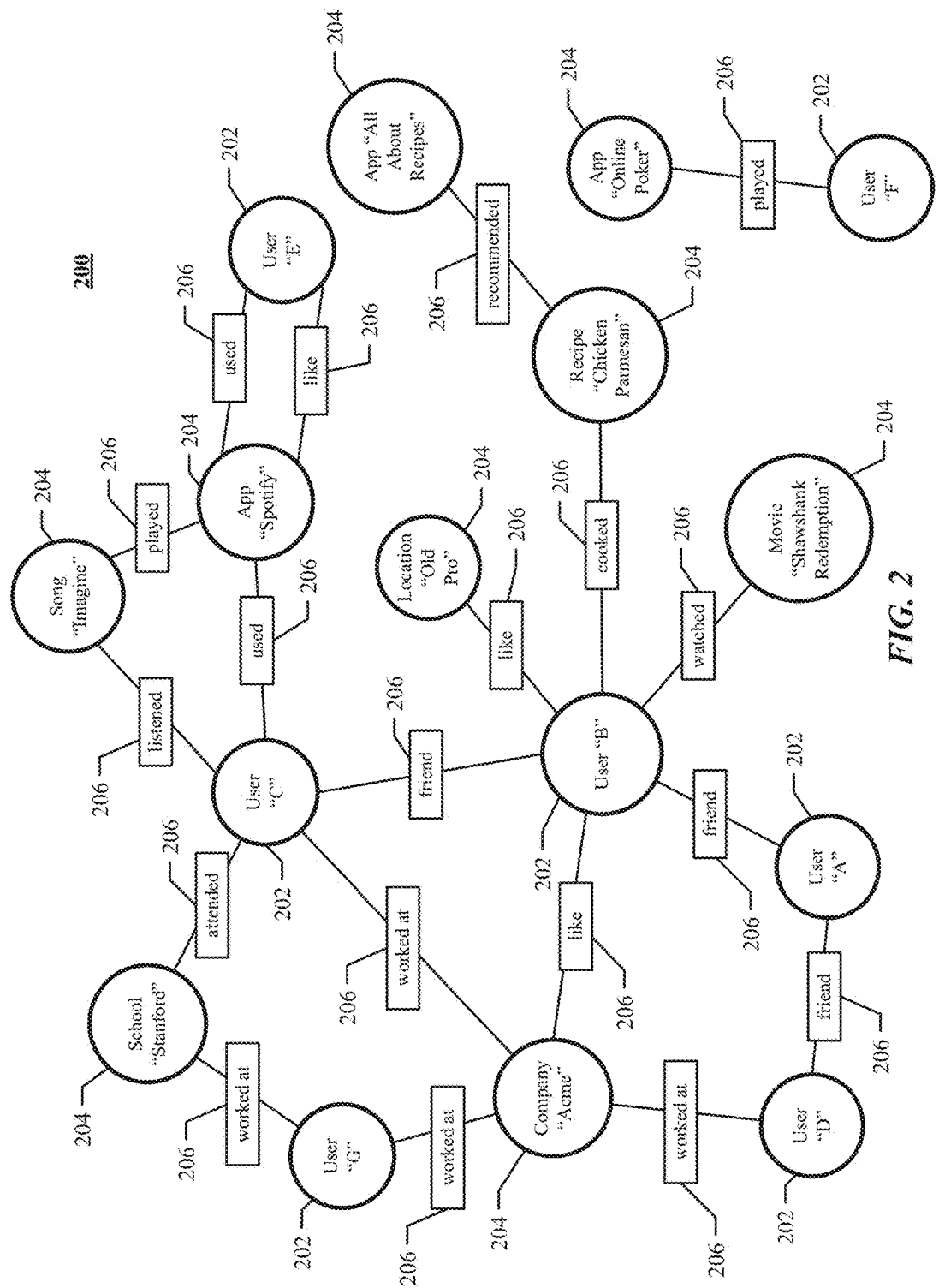
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206 ) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, U.S. patent application Ser. No. 14/304,596, filed 13 June 2014, U.S. patent application Ser. No. 14/452,307, filed 5 Aug. 2014, U.S. patent application Ser. No. 14/745,001, filed 19 Jun. 2015, U.S. patent application Ser. No. 14/826,868, filed 14 Aug. 2015, and U.S. patent application Ser. No. 14/454,826, filed 8 Aug. 2016 which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
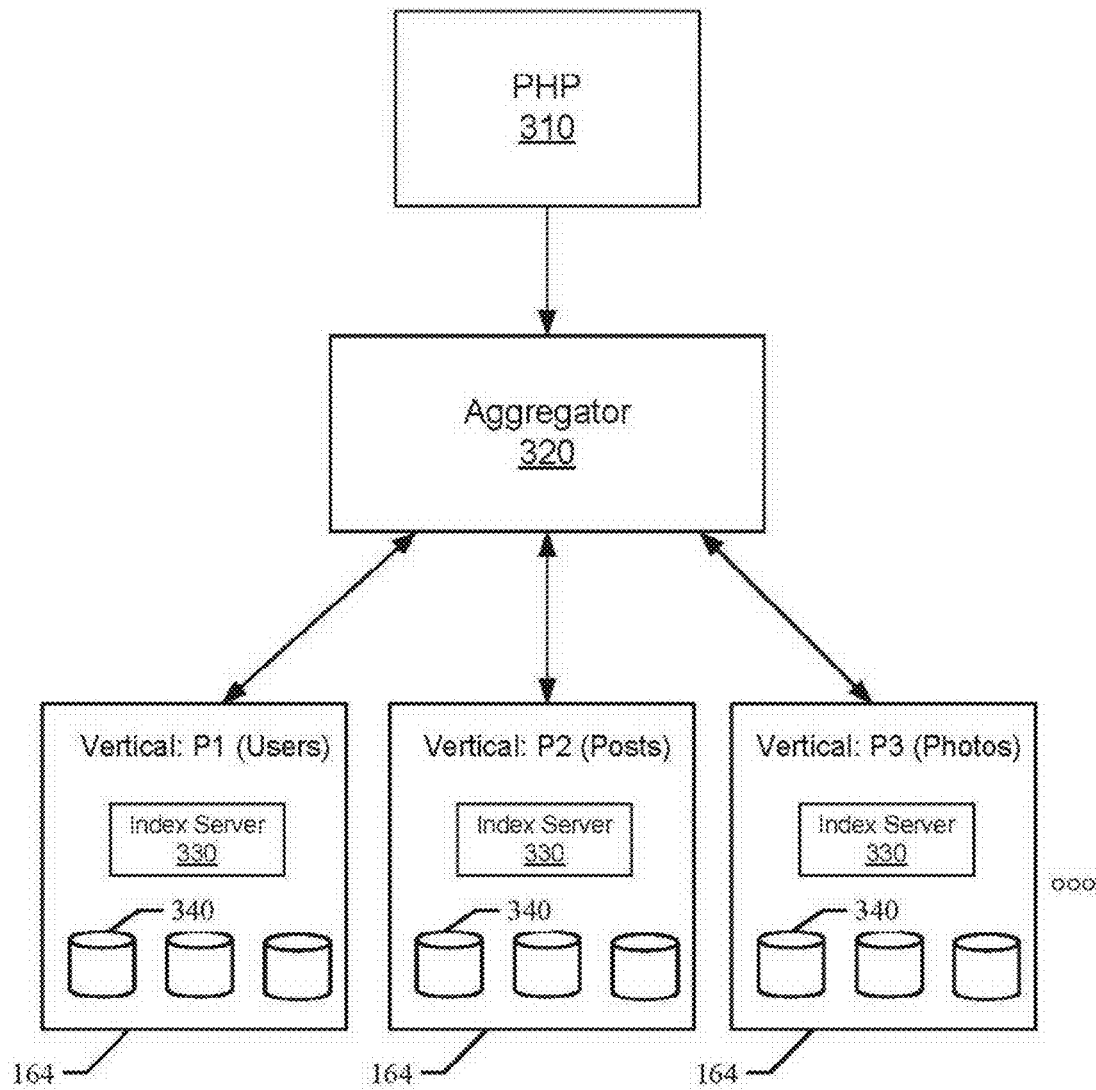
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723, 861, filed 21 Dec. 2012, and U.S. patent application Ser. No. 13/870,113, filed 25 Apr. 2013, each of which is incorporated by reference.

Categorizing Objects for Queries

In particular embodiments, objects corresponding to search results may be grouped into various categories and ranked within each category based on multiple axes or factors. The ranking of an object with respect to a category may be calculated as a weighting of scores based with respect to the multiple axes, where the weighting may be based on the category. The categories may be defined in a variety of ways and each object may be scored or ranked differently for each category (e.g., scoring posts to determine if they are highly "newsy" or "celebrity", etc.). As an example and not by way of limitation, there may be a domain expert category, a celebrity category, a review category, a how-to category, a commentary category, a news category, or any other suitable category. Previously, search results would be returned in an aggregate list without regard to a category. This previous method may have resulted in many dissimilar results being returned into one disorganized list with average results (e.g., results that have middling scores with respect to multiple axes, but possibly not including results with a high score with respect to a single axis). The embodiments described herein may have the benefit of identifying the best search results for each category (e.g., the best "news" results, the best "celebrity" result, etc.), and the top results from each category may be presented to the user as a list organized by category.

In particular embodiments, the social-networking system 160 may receive, from a client system 130 of a user of an online social network, a query inputted by the user. In particular embodiments, the social-networking system 160 may identify a set of objects associated with the online social network matching the query. The social-networking system 160 may search a data store 164 (i.e., vertical) to identify content matching the query. In particular embodiments, identifying the set of objects associated with the online social network matching the query may comprise searching a plurality of verticals 164 to identify a plurality of sub-sets of objects from the plurality of verticals 164, respectively, that match the search query. Each vertical 164 may store objects of a particular object-type. The object-types stored by a vertical 164 may include, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects and verticals, this disclosure contemplates any suitable objects and any suitable verticals.

FIG. 4A illustrates an example set of K weighted sub-scores corresponding to an example set of C categories for an example identified object. In particular embodiments, the social-networking system 160 may calculate, for each identified object, a plurality of category-scores corresponding to a plurality of categories, respectively. In this example, there are C categories, and each of category_1 to cateogry_C may correspond to a particular category of the C categories. To calculate a category-score, the social-networking system 160 may calculate a plurality of sub-scores, which may be referred to as "axes" or "scoring axes," and then the weighted sub-scores may be used to calculated the category-score. In this example, there are K scoring axes, and each sub-score may correspond to a scoring axis of axis_1 to axis_K. $R(k)$ may be the sub-score of the identified object with respect to the $k^{th}$ axis, and $a(k, c)$ may be a weight of the $k^{th}$ sub-score with respect to the $c^{th}$ category.

In particular embodiments, each category-score may be calculated based on a plurality of sub-scores corresponding to a plurality of scoring axes, respectively. Each scoring axis may correspond to a particular factor associated with the respective scoring axis. The factors associated with a scoring axis may include, for example, social-graph information (such as, for example, degree of separation between social-graph nodes, social-graph affinity, or social relevance, each of which may be its own axis), recency, topic relevance, author quality, text similarity, popularity, proximity, a user's search history, or other suitable factors, or any suitable combination thereof. Each category-score may be calculated based on a weighting of the plurality of sub-scores. As an example and not be way of limitation, category-scores may be calculated as a weighted average, a weighted product, or any other suitable weighting or combination thereof. The weighting for each sub-score may be based on the category corresponding to the respective category-score. A set of weights may be used when scoring with respect to a particular category, where the weights may emphasize factors that are important for the category and deemphasize factors unimportant for the category. As an example and not by way of limitation, a news category may weight a recency factor and an author quality factor higher than other factors based on the relative important of those factors to the news category. As an example and not by way of limitation, referencing FIG. 4A, each $a(k, c)$ may be a weighting for each sub-score $R(k)$ based on the category. For a particular category C, a higher value of $a(k, C)$ may correspond to a particular factor associated with axis k having more weight or importance when scoring with respect to category C. In particular embodiments, the weighting of the plurality of sub-scores for at least one category-score may comprise a weighted arithmetic mean of the plurality of sub-scores. As an example and not by way of limitation, the category-score for a particular category C for the example identified object in FIG. 4A may be calculated as $$\frac{\sum_k a(k, C) R(k)}{\sum_k a(k, C)}.$$

In particular embodiments, for an identified object, the sub-score corresponding to at least one of the scoring axes may be based on a social-graph affinity of the user with respect to the identified object. As an example and not by way of limitation, in response to a query "Photos of my friends," the social-networking system 160 may identify photo-type content objects in a photos vertical 164, where each identified photo is tagged with a least one user who is a friend of the querying user (i.e., users corresponding to user nodes 202 connected by friend-type edges 206 to the user node 202 corresponding to the querying user). When calculating sub-scores for identified concept nodes 204 corresponding to photos with the user's friends tagged in the photo, the social-networking system 160 may score photos based on the social-graph affinity (e.g., as measured by an affinity coefficient) of the users tagged in the photo with respect to the querying user. Furthermore, photos showing more of the querying user's friends may have a higher affinity score than photos showing fewer of the user's friends, since having more friends tagged in the photo may increase the querying user's affinity with respect to that particular photo. As another example and not by way of limitation, in response to a query from a user <Mark>, the social-networking system 160 may identify a set of objects that includes users <Tom>, <Dick>, and <Harry>. The social-networking system 160 may then score the users <Tom>, <Dick>, and <Harry> based on their respective social-graph affinity with respect to the querying user <Mark>. For example, the social-networking system 160 may score the identified nodes of users <Tom>, <Dick>, and <Harry> based in part on a number of posts authored by those users and liked by the user <Mark>. If user <Dick> authored three posts that were liked by the user <Mark>, user <Tom> authored two posts liked by <Mark>, and user <Harry> authored one post like by <Mark>, the social-networking system 160 may score user <Dick> as highest with respect to an affinity-score axis since he authored most of the posts liked by the user <Mark>, with <Tom> and <Harry> having consecutively lower scores. Although this disclosure describes calculating sub-scores for objects based on social-graph affinity in a particular manner, this disclosure contemplates calculating sub-scores for objects based on social-graph affinity in any suitable manner.

In particular embodiments, for an identified object, the sub-score corresponding to at least one of the scoring axes may be based on a calculated text similarity between the identified object and the query. The text similarity or textual relevance of a query may be based on how the terms and number of terms in the query match to text associated with an identified object. In particular embodiments, a text-similarity sub-score may be based on matches between a query and words or phrases associated with an identified object (e.g., summary, subject, title, author, keywords, or body of text associated with an identified object). In particular embodiments, a text-similarity sub-score may be based on a number of text matches between a query and text associated with an identified object. As an example and not by way of limitation, an identified object that includes 80% of the terms of a query may have a higher text-similarity sub-score than another identified object that includes 50% of the terms. As another example and not by way of limitation, if a user submits a query "Hawaii bike rides," a post that includes the phrase "bike rides in Hawaii" may have a relatively high text-similarity sub-score (e.g., 1.0 out of 1.0), while a post that includes the phrase "bike-riding vacations" may have a lower text-similarity score (e.g., 0.6 out of 1.0). In particular embodiments, a text-similarity sub-score may be based on a number of times text from a query occurs in text associated with an identified object. For example, if a user submits a query "coffee shops in San Francisco," an identified object that includes the terms "coffee" or "coffee shop" 5 times may have a higher text-similarity sub-score than another identified object that includes "coffee" 1 time. In particular embodiments, a text-similarity sub-score may be based on a term frequency-inverse document frequency (TF-IDF) metric. A term frequency-inverse document frequency metric may increase based on the number of times a query term appears in an identified object, but decrease based on the frequency of the query term across a plurality of objects. Although this disclosure describes calculating sub-scores for objects based on text similarity in a particular manner, this disclosure contemplates calculating sub-scores for objects based on text similarity in any suitable manner.

In particular embodiments, for an identified object, the sub-score corresponding to at least one of the scoring axes may be based on a recency value associated with the identified object. A recency value may correspond to how recently an associated object was generated, created, posted, sent, received, viewed, or commented on. For example, a recency value associated with an identified object may be determined based on a time or date associated with the object compared with the current time or date. Objects associated with more recent dates may have higher recency-value sub-scores than objects associated with dates further in the past. A recency value may be calculated using a decay function, such as a Gaussian decay function, a linear decay function, an exponential decay function, or any other suitable function. As an example and not by way of limitation, an identified object that was posted two days ago may have a relatively high recency-value sub-score (e.g., 0.9 out of 1.0), while another identified object that was posted a year ago may have a relatively low recency-value sub-score (e.g., 0.2 out of 1.0). In particular embodiments, a recency value may correspond to a time or date associated with a future event or activity, such that an event occurring sooner in the future may have a higher recency-value sub-score than an event happening further in the future. As an example and not by way of limitation, an identified object corresponding to a party happening tomorrow may have a higher recency-value sub-score than another identified object corresponding to a concert happening two weeks in the future. Although this disclosure describes calculating sub-scores for objects based on recency in a particular manner, this disclosure contemplates calculating sub-scores for objects based on recency in any suitable manner.

In particular embodiments, for an identified object, the sub-score corresponding to at least one of the scoring axes may be based on a calculated topic relevance for the identified object with respect to the query. The social-networking system 160 may determine one or more topics related to a search query and one or more topics associated with the identified object. As an example and not by way of limitation, the social-networking system 160 may utilize a topic tagger to identify topics associated with identified objects, as disclosed in U.S. patent application Ser. No. 14/470,583, filed 27 Aug. 2014, which is incorporated herein by reference. Objects with topics associated with the search query may receive a higher topic-relevance sub-score than objects with unrelated topics. As an example and not by way of limitation, for a search query related to the television show GAME OF THRONES (e.g., "Tyrion Lannister actor"), objects associated with a related topic (e.g., an article about David Benioff, the show runner of GAME OF THRONES) may have a higher topic-relevance sub-score than an object associated with an unrelated topic. Although this disclosure describes calculating sub-scores for objects based on topic relevance in a particular manner, this disclosure contemplates calculating sub-scores for objects based on topic relevance in any suitable manner.

In particular embodiments, for an identified object, the sub-score corresponding to at least one of the scoring axes may be based on a calculated author quality associated with the identified object. As an example and not by way of limitation, an identified object may have a higher author-quality sub-score if it is associated with a popular author, while another identified object associated with a less popular author may have a lower author-quality sub-score. In particular embodiments, an author-quality sub-score may be calculated with respect to a topic. As an example and not by way of limitation, for a search query related to STAR WARS (e.g., "Wookiee planet"), an identified object may have a higher author-quality sub-score if it is authored by George Lucas, the creator of STAR WARS, while another identified object associated with an author unrelated to the query may have a lower author-quality sub-score. In particular embodiments, an author-quality sub-score may be based in part on a number of "likes" or views an author has received or a measure of the author's global popularity on the online social network. In particular embodiments, an author-quality sub-score may be based in part on a number of connecting edges 206 to nodes associated with a particular author. For example, an author associated with nodes having more connecting edges 206 may be more popular and may have a higher author-quality sub-score than another author associated with nodes having fewer connecting edges 206. In particular embodiments, an author-quality sub-score may be based in part on an author's popularity with respect to the querying user or friends of the querying user. For example, an identified object associated with an author who has received a greater number of "likes" from friends of a querying user may receive a higher author-quality sub-score than another author who has received fewer "likes" from friends of the querying user. Although this disclosure describes calculating sub-scores for objects based on author quality in a particular manner, this disclosure contemplates calculating sub-scores for objects based on author quality in any suitable manner.

In particular embodiments, for an identified object, at least one sub-score may be based on a degree of separation in a social graph 200 between the user node 202 corresponding to the querying user and a node corresponding to the identified object. As an example and not by way of limitation, a sub-score for an identified object may be higher if the user node 202 corresponding to the querying user and the node corresponding to an identified object have a smaller degree of separation. For example, an identified object associated with the WASHINGTON POST may have a higher author-quality sub-score for a user who has liked the WASHINGTON POST in the past compared to a user who has not. Although this disclosure describes calculating sub-scores for objects based on a degree of separation in a particular manner, this disclosure contemplates calculating sub-scores for objects based on a degree of separation in any suitable manner.

FIG. 4B illustrates an example set of particular weighted sub-scores corresponding to an example set of particular categories for an example identified object. In particular embodiments, each scoring axis may correspond to a particular factor associated with the respective scoring axis. In the example illustrated in FIG. 4B, four example scoring axes are illustrated, corresponding to the particular factors of recency, social relevance, text similarity, and author quality. Although FIG. 4B illustrates particular scoring axes, this disclosure contemplates any suitable scoring axes corresponding to any suitable factor. As an example and not by way of limitation, a scoring axis may correspond to factors associated with social-graph information (such as, for example, degree of separation between social-graph nodes, social-graph affinity, or social relevance, each of which may be its own axis), recency, topic relevance, author quality, text similarity, popularity, proximity, a user's search history, or other suitable criteria, or any suitable combination thereof.

In particular embodiments, each category-score may be calculated based on a plurality of sub-scores corresponding to a plurality of scoring axes. In particular embodiments, each category-score may be calculated based on a weighting of the plurality of sub-scores. In this example, four categories are illustrated, corresponding to a news category, a celebrity category, a how-to category, and a commentary category. Each category-score in FIG. 4B may be based on weighted sub-scores corresponding to the example weighted sub-scores for recency, social-relevance, text similarity, and author quality. As an example and not by way of limitation, the category-score corresponding to the news category bay be based on the weighted sub-scores of 0.2, 0.4, 0.1, and 0.3, corresponding to the recency, social relevance, text similarity, and author quality axes, respectively. Although FIG. 4B illustrates particular categories, this disclosure contemplates any suitable categories.

In particular embodiments, each category-score for an identified object may be calculated based on a weighting of sub-scores for the identified object. As an example and not by way of limitation, the identified object for FIG. 4B may have a sub-score R(author quality)=0.6 corresponding to the author quality axis. In this example, a weighting of a(author quality, news)=a(author quality, celebrity)=0.5 may be used for the author quality axis with respect to the news category and celebrity category, a weight of a(author quality, how to)=1.0 may be used for the author quality axis with respect to the how-to axis, and a weight of a(author quality, commentary)=⅙ may be used for the author quality axis with respect to the commentary axis. The weighted sub-score with respect to a category may be calculated by multiplying the sub-score by the weight, as illustrated by the entries in the table of FIG. 4B, for which weighted sub-scores R(author quality)a(author quality, news)=0.3, R(author quality)a(author quality, celebrity)=0.3, R(author quality)a(author quality, how to)=0.6, and R(author quality)a(author quality, commentary)=0.1. Although this example uses particular values for sub-scores and weights, this disclosure contemplates that sub-scores and weights may have any suitable value.

In particular embodiments, the weighting of the plurality of sub-scores for a category-score may be a weighted arithmetic mean of the plurality of sub-scores. As an example and not by way of limitation, the news category in FIG. 4B may use weights of 0.9, 0.3, 0.3, and 0.5 for the recency, social relevance, text similarity, and author quality axes, respectively. A category-score for the news category may be calculated as the sum of weighted sub-scores divided by the sum of weights. In this example, the category-score for the news category may be $$\frac{0.2 + 0.4 + 0.1 + 0.3}{0.9 + 0.3 + 0.3 + 0.5} = 0.5.$$

Although this disclosure may use particular sub-scores, weights, and category-scores, this disclosure contemplates any suitable sub-scores, weights, and category-scores.

In particular embodiments, each category-score may be calculated based on a degree of separation between the first node and a second node corresponding to the identified object. As an example and not by way of limitation, a user may have liked an entity related to business and finance news, such as the WALL STREET JOURNAL. Based on this, an identified object associated with Jeff Bezos, founder and CEO of AMAZON, may receive a higher category-score with respect to a celebrity category than for a user who has no connection to business and finance news. Although this disclosure may describe calculating a category-score based on a degree of separation in a particular manner, this disclosure contemplates calculating a category-score based on a degree of separation in any suitable manner.

FIG. 5A illustrates an example set of category scores for an example set of identified objects. In particular embodiments, the social-networking system 160 may calculate, for each identified object, a plurality of category-scores corresponding to a plurality of categories, respectively. In this example, each of object_1 to object_N may correspond to an identified object and each of category_1 to cateogry_C may correspond to a category. Further, $S_n(c)$ may be the category-score of identified object n with respect to category c.

In particular embodiments, each category-score S for an identified object n may be calculated based on a weighting of sub-scores for the identified object. In particular embodiments, the weighting of the plurality of sub-scores for a category-score may be a weighted arithmetic mean of the plurality of sub-scores. As an example and not by way of limitation, the category-score S for identified object n with respect to category c may be calculated as $$S_n(c) = \frac{\sum_k a(k, c)R(k)}{\sum_k a(k, c)}$$

where R(k) may be the sub-score of identified object n with respect to the $k^{th}$ axis, and a(k, c) may be a weight of the $k^{th}$ sub-score with respect to category c.

In particular embodiments, the plurality of categories may comprise one or more pre-determined categories. Pre-determined categories may be determined prior identifying a set of objects in response to a query. As an example and not by way of limitation, pre-determined categories may include a domain expert category, a celebrity category, a review category, a how-to category, a commentary category, a news category, or any other suitable category. Although this disclosure describes particular pre-determined categories, this disclosure contemplates use of any suitable pre-determined categories.

In particular embodiments, the plurality of categories may comprise one or more categories determined dynamically based on one or more topics associated with the identified objects. As an example and not by way of limitation, the social-networking system 160 may receive a search query for "THE AVENGERS." In this example, dynamic categories may include "IRON MAN" or "CAPTAIN AMERICA" based on these topics appearing in many of the identified objects. In other words, dynamic categories corresponding to particular topics are created based on the appearance of those topics in the identified objects. The social-networking system 160 may calculate a category-score for the one or more dynamically determined categories. As an example and not by way of limitation, if "IRON MAN" is a dynamically determined category, a category-score for the "IRON MAN" category may be calculated. In particular embodiments, a topic of an identified object and a corresponding dynamic category may be determined by a topic tagger. The social-networking system 160 may utilize a topic tagger to identify topics associated with identified objects, as disclosed in U.S. patent application Ser. No. 14/470,583, filed 27 Aug. 2014, which is incorporated herein by reference. As an example and not by way of limitation, a topic tagger may determine that a number of identified objects are related to the topic "CAPTAIN AMERICA," and based on this, "CAPTAIN AMERICA" may be dynamically determined as a category. In particular embodiments, the plurality of categories may comprise one or more categories determined dynamically based on a language-model analysis of the identified objects. As an example and not by way of limitation, using the example search query for "THE AVENGERS," dynamic categories may include "IRON MAN" or "CAPTAIN AMERICA" based on a language model (e.g., the n-grams "IRON MAN," "CAPTAIN AMERICA," or "TONY STARK" appear with a relatively high frequency in the results). Although this disclosure describes dynamically determining categories in a particular manner, this disclosure contemplates dynamically determining categories in any suitable manner.

FIG. 5B illustrates an example set of particular category-scores corresponding to an example set of identified objects. In particular embodiments, the social-networking system 160 may categorize each identified object into a category of the plurality of categories based on the category-scores for the identified object. As an example and not by way of limitation, referencing FIG. 5B, object_6 may be categorized into the celebrity category based having a category-score of 0.7 with respect to the celebrity category, compared to the lower category-scores with respect to other categories. In particular embodiments, each identified object may be categorized into no more than one category of the plurality of categories. An identified object may be categorized into only the category for which it has the highest category-score. For example, object_4 may be categorized into the how-to category based on a category-score of 0.8 with respect to the how-to category, but not the celebrity category, despite receiving a 0.7 category-score with respect to the celebrity category. Although FIG. 5B illustrates particular categories, objects, and category-scores, this disclosure contemplates any suitable categories, objects, or category-scores.

In particular embodiments, categorizing each identified object into a category of the plurality of categories may be based on a pre-filtering process. As an example and not by way of limitation, as discussed above, the social-networking system 160 may utilize a topic tagger to identify topics associated with identified objects. A topic tagger may associate an identified object with a particular topic. An identified object may be categorized based on topics associated with the object. As an example and not by way of limitation, a topic tagger may identify that a particular identified object is associated with the topic of celebrity singer-songwriter Taylor Swift. Further, in this example, there may exist a celebrity category. Based on the association of the particular identified object with a celebrity, that object may be categorized into the celebrity category. In particular embodiments, an identified object may comprise metadata associated with a particular category. As an example and not by way of limitation, an identified object may comprise metadata indicating that it is a news article (e.g., the object comprises metadata indicated that it is an article associated with the website CNN.com, a news content provider). In this example, the identified object may be categorized in a news category based on the metadata. Although this disclosure describes categorizing an identified object into a category based on a pre-filtering process in a particular manner, this disclosure contemplates categorizing an identified object into a category based on a pre-filtering process in any suitable manner.

In particular embodiments, categorizing each identified object into a category of the plurality of categories may be based on a natural-language model analysis of the identified object. In particular embodiments, a natural-language model may utilize a deep-learning model (e.g., a machine learning model, a neural network, etc.). A natural-language model may be a unigram model, an n-gram model, a continuous space language model, or any other suitable language model. As an example and not by way of limitation, an analysis of a particular identified object based on natural-language model may determine that there is a 94% probability that the object is associated with news. In this example, the particular identified object may contain n-grams that indicate that the object is a news article (e.g., the object may reference a common news topic or contain terminology associated with news articles). Based on this natural-language analysis of the object, the object may be categorized into a news category. Although this disclosure describes categorizing an identified object into a category based on a natural-language model analysis in a particular manner, this disclosure contemplates categorizing an identified object into a category based on a natural-language model analysis in any suitable manner.

In particular embodiments, the social-networking system 160 may adjust the category-scores for one or more of the identified objects based on an author diversity among the categorized objects having the highest calculated category-scores. As an example and not by way of limitation, a particular set of identified objects may comprise a large number of identified objects with the highest category-scores authored by columnist Ezra Klein. In this example, some of the objects authored by Ezra Klein may have the category-score adjusted downward, while other objects authored by Ezra Klein may retain the original category-score. This may be promote search results that feature a diverse set of authors. In particular embodiments, an author may be a person or an institution. As an example and not by way of limitation, for an object comprising an article authored by Roger Cohen for the NEW YORK TIMES, the author may be Roger Cohen or the NEW YORK TIMES. Although this disclosure describes adjusting category-scores based on author diversity in a particular manner, this disclosure contemplates adjusting category-scores based on author diversity in any suitable manner.

In particular embodiments, the social-networking system 160 may send, to the client system 130 in response to the query, one or more search results corresponding to one or more of the categorized objects for display. Each search result may reference the respective categorized object. The one or more categorized objects of the search results may comprises objects categorized into one or more selected categories. For each selected category one of the search results may correspond to a categorized object having a highest calculated category-score corresponding to the respective selected category. The search results may be sent to the user, for example, in the form of a list of links on a search-results webpage, each link being associated with a different webpage that contains some of the identified resources or content. In particular embodiments, each link in the search results may be in the form of a Uniform Resource Locator (URL) that specifies where the corresponding web-page is located and the mechanism for retrieving it. The social-networking system 160 may then send the search-results webpage to the web browser 132 on the user's client system 130. The user may then click on the URL links or otherwise select the content from the search-results webpage to access the content from the social-networking system 160 or from an external system (such as, for example, third-party system 170), as appropriate. In particular embodiments, each search result may include a link to a profile interface and a description or summary of the profile interface (or the node corresponding to that profile interface). The search results may be presented and sent to the querying user as a search-results interface. The search-results interface may display search results based on the categories of the respective identified objects. As an example and not by way of limitation, a search-results interface may display separate lists for each selected category, each list comprising the search results with the highest category-scores for the corresponding selected categories. When generating the search results, the social-networking system 160 may generate and send to the querying user one or more snippets for each search result, where the snippets are contextual information about the target of the search result (i.e., contextual information about the social-graph entity, profile interface, or other content corresponding to the particular search result). In particular embodiments, categories may be selected based on a pre-determined selection of categories. As an example and not by way of limitation, a news category may be a pre-determined selected category. Additionally or alternatively, categories may be selected based on the identified objects. As an example and not by way of limitation, categories may be selected based on a number of identified objects being categorized into a category, having a threshold category-score, or based on identified objects in any suitable manner. As an example and not by way of limitation, if at least 10 percent of the identified objects are categorized into a particular category, that particular category may be selected. As another example and not by way of limitation, if a threshold number of identified objects are categorized into a particular category, and at least 15 percent of those objects have at least threshold category-score corresponding to the particular category, then that particular may be selected. In particular embodiments, categories may be selected based on a degree of separation between the first node and a one or more second nodes associated with one or more of the selected categories. For example, a news category may be selected based on a relatively small degree of separation between the node corresponding to the user and a node corresponding to a news category. Although this disclosure describes sending particular search results and selecting categories in a particular manner, this disclosure contemplates sending any suitable search results and selecting categories in any suitable manner.

In particular embodiments, for each selected category, the one or more search results categorized into the selected category may comprise a set of blended search results. The blended search results may be generated by blending the plurality of sub-sets of identified objects from the plurality of verticals. As discussed above, identifying the set of objects associated with the online social network matching the query may comprise searching a plurality of verticals to identify a plurality of sub-sets of objects from the plurality of verticals, respectively, that match the search query. Blending search results may refer to a process where a plurality of sets of identified objects are combined, or blended, to form a set of blended search results that may be returned in response to a search query. Each sub-set may be associated with a particular vertical. In connection with blended search results, particular embodiments may utilize one or more systems, components, elements, functions, methods, operations, or steps disclosed in U.S. patent application Ser. No. 14/454,826, filed 8 Aug. 2016 and U.S. patent application Ser. No. 14/244,748, filed 3 Apr. 2014, each of which are incorporated by reference. Although this disclosure describes blending search results in a particular manner, this disclosure contemplates blending search results in any suitable manner.

In particular embodiments, the social-networking system 160 may receive, from the client system 130, a request for additional search results associated with a particular category of the plurality of categories. As an example and not by way of limitation, a search-results interface may display search results organized by the selected categories, with a separate list of search results corresponding to each selected category being displayed. In this example, each category may have a button or link that allows a user to search for more search results within a particular category. If a user clicks the button, the client system 130 may send to the social-networking system 160 a request for additional search results associated with the particular category. In particular embodiments, the social-networking system 160 may send, to the client system 130 in response to the request, one or more search results corresponding to the particular category. As an example and not by way of limitation, if the request is for more search results corresponding to a commentary category, the social-networking system 160 may identify and send additional search results corresponding to the commentary category. Although this disclosure describes sending additional search results associated with a particular category in respond to a request in a particular manner, this disclosure contemplates sending additional search results associated with a particular category in respond to a request in any suitable manner.

In particular embodiments, the social-networking system 160 may, for each selected category, rank the search results corresponding to the selected category based on the category-score for the categorized object corresponding to the search result. As an example and not by way of limitation, search results corresponding to objects with higher category-scores may be ranked higher. In particular embodiments, higher ranked objects may be displayed above lower ranked objects. Although this disclosure describes ranking search based on a category-score in a particular manner, this disclosure contemplates ranking search based on a category-score in any suitable manner.

Figure 6:
FIG. 6 illustrates an example post on a social network and an example graphical representation of category-scores for the post.
Figure 6:
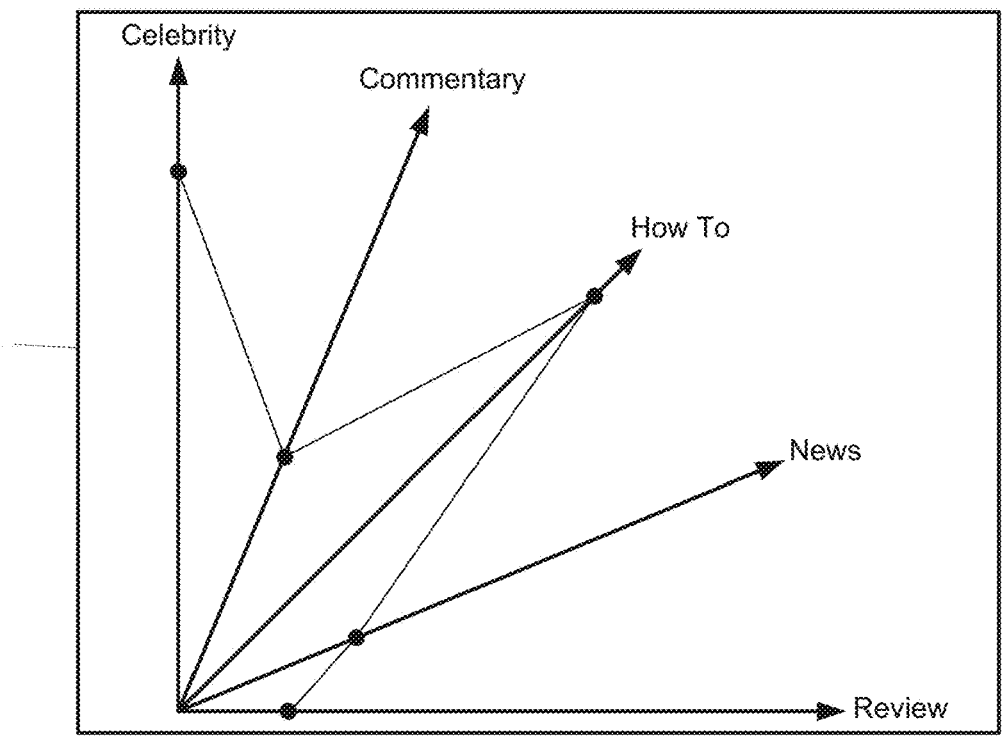

FIG. 6 illustrates an example post on a social network and an example graphical representation of category-scores for the post. Post 610 may be a post from television personality and chef Alton Brown, which includes text and a link to a recipe for watermelon rind pickles. This post may match a query received from a user, for example, a query for "pickle recipes." Graph 620 may be a graphical representation of category-scores for post 610 with respect to a celebrity category, a commentary category, a how-to category, a news category, and a review category. For each of these categories, the corresponding category-score calculated for post 610 may be plotted along the corresponding axes. Graph 620 may allow a user to quickly ascertain relative category-scores for post 610. For example, graph 620 shows that post 610 has relatively high category-scores for the celebrity and how-to categories, with the highest category-score corresponding to the how-to category. Although FIG. 6 illustrates a particular post and a particular graphical representation of category-scores, this disclosure contemplates any suitable post and any suitable graphical representation of any suitable category-scores.

Figure 7:
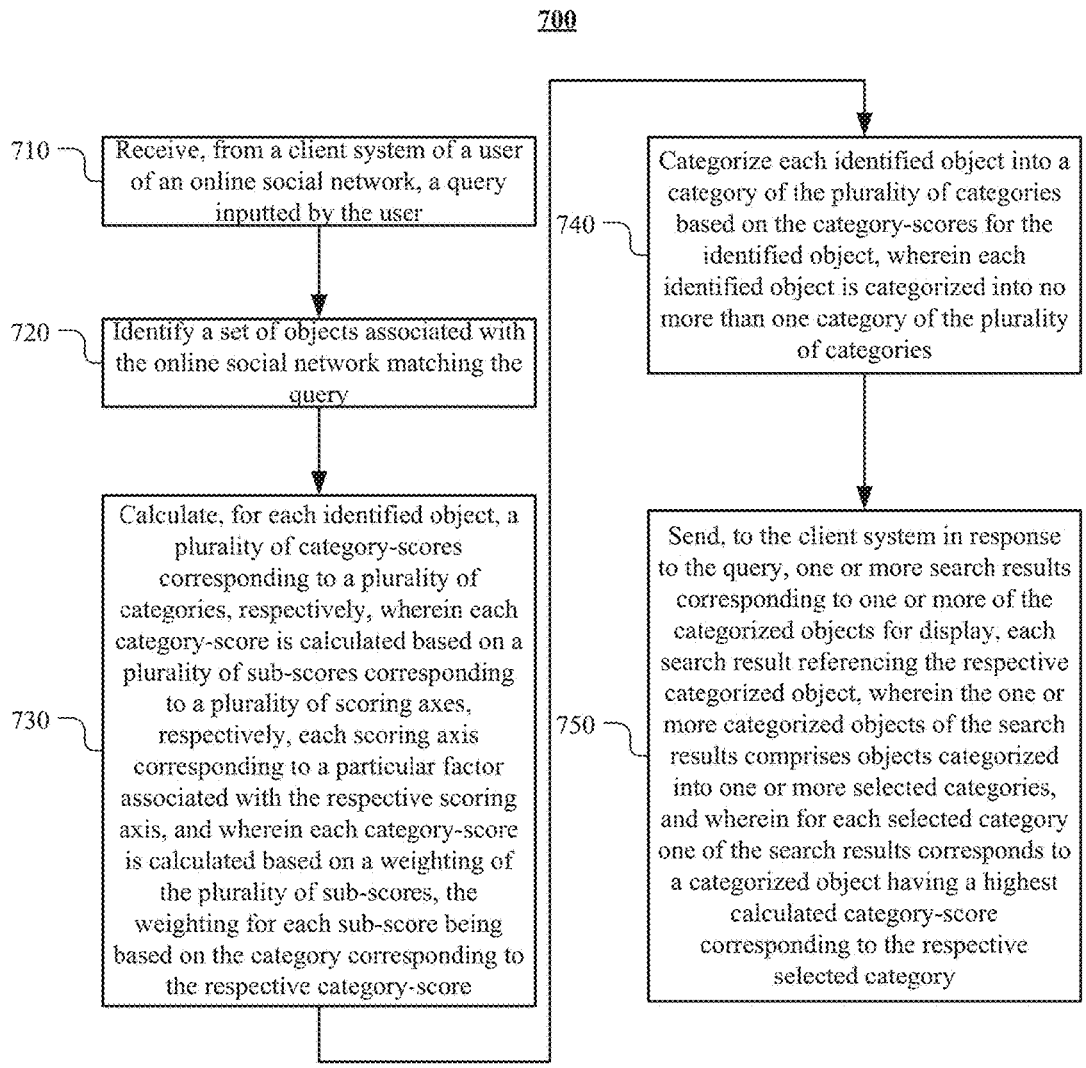
FIG. 7 illustrates an example method for categorizing objects based on a plurality of category-scores.

FIG. 7 illustrates an example method 700 for categorizing objects based on a plurality of category-scores. The method may begin at step 710, where the social-networking system 160 may receive, from a client system of a user of an online social network, a query inputted by the user. At step 720, the social-networking system 160 may identify a set of objects associated with the online social network matching the query. At step 730, the social-networking system 160 may calculate, for each identified object, a plurality of category-scores corresponding to a plurality of categories, respectively, wherein each category-score may be calculated based on a plurality of sub-scores corresponding to a plurality of scoring axes, respectively, each scoring axis corresponding to a particular factor associated with the respective scoring axis, and wherein each category-score may be calculated based on a weighting of the plurality of sub-scores, the weighting for each sub-score being based on the category corresponding to the respective category-score. At step 740, the social-networking system 160 may categorize each identified object into a category of the plurality of categories based on the category-scores for the identified object. At step 750, the social-networking system 160 may send, to the client system 130 in response to the query, one or more search results corresponding to one or more of the categorized objects for display, each search result referencing the respective categorized object, wherein the one or more categorized objects of the search results comprises objects categorized into one or more selected categories, and wherein for each selected category one of the search results may correspond to a categorized object having a highest calculated category-score corresponding to the respective selected category. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for categorizing objects based on a plurality of category-scores including the particular steps of the method of FIG. 7, this disclosure contemplates any suitable method for categorizing objects based on a plurality of category-scores including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
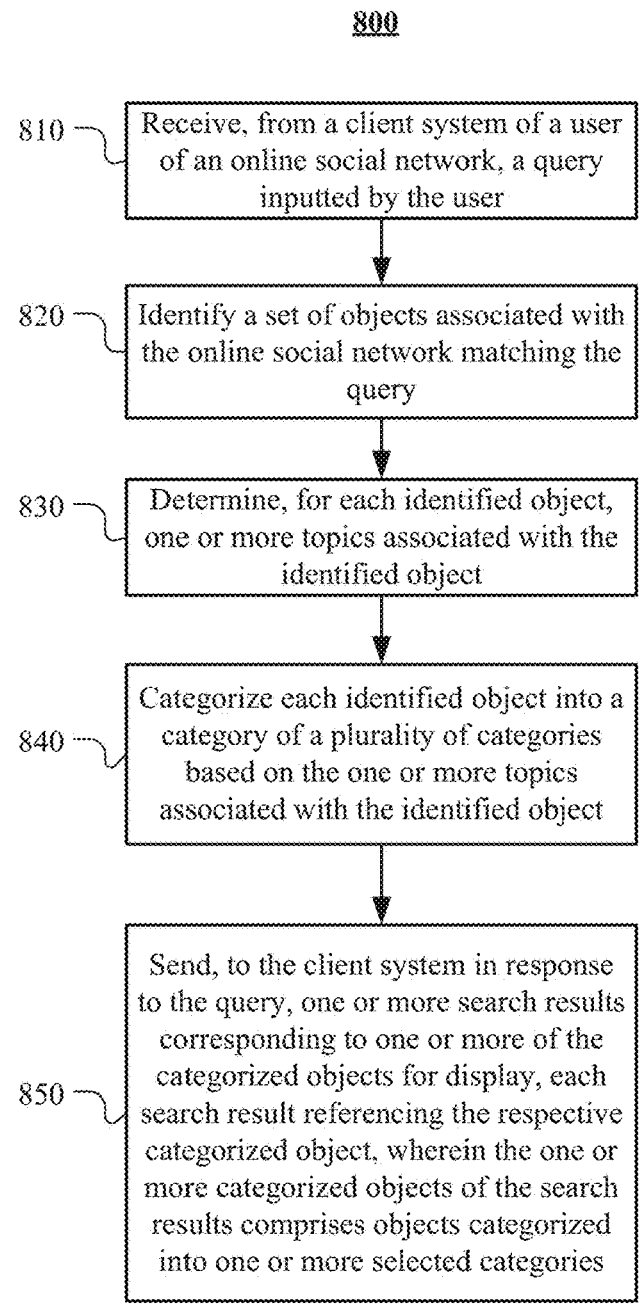
FIG. 8 illustrates an example method for categorizing objects based on a plurality of category-scores using a pre-filtering process.

FIG. 8 illustrates an example method 800 for categorizing objects based on a plurality of category-scores using a pre-filtering process. The method may begin at step 810, where the social-networking system 160 may receive, from a client system 130 of a user of an online social network, a query inputted by the user. At step 820, the social-networking system 160 may identify a set of objects associated with the online social network matching the query. At step 830, the social-networking system 160 may determine, for each identified object, one or more topics associated with the identified object. At step 840, the social-networking system 160 may categorize each identified object into a category of a plurality of categories based on the one or more topics associated with the identified object. At step 850, the social-networking system 160 may send, to the client system 130 in response to the query, one or more search results corresponding to one or more of the categorized objects for display, each search result referencing the respective categorized object, wherein the one or more categorized objects of the search results comprises objects categorized into one or more selected categories. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for categorizing objects based on a plurality of category-scores including the particular steps of the method of FIG. 8, this disclosure contemplates any suitable method for categorizing objects based on a plurality of category-scores including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated based at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects.

The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160 ). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Systems and Methods

Figure 9:
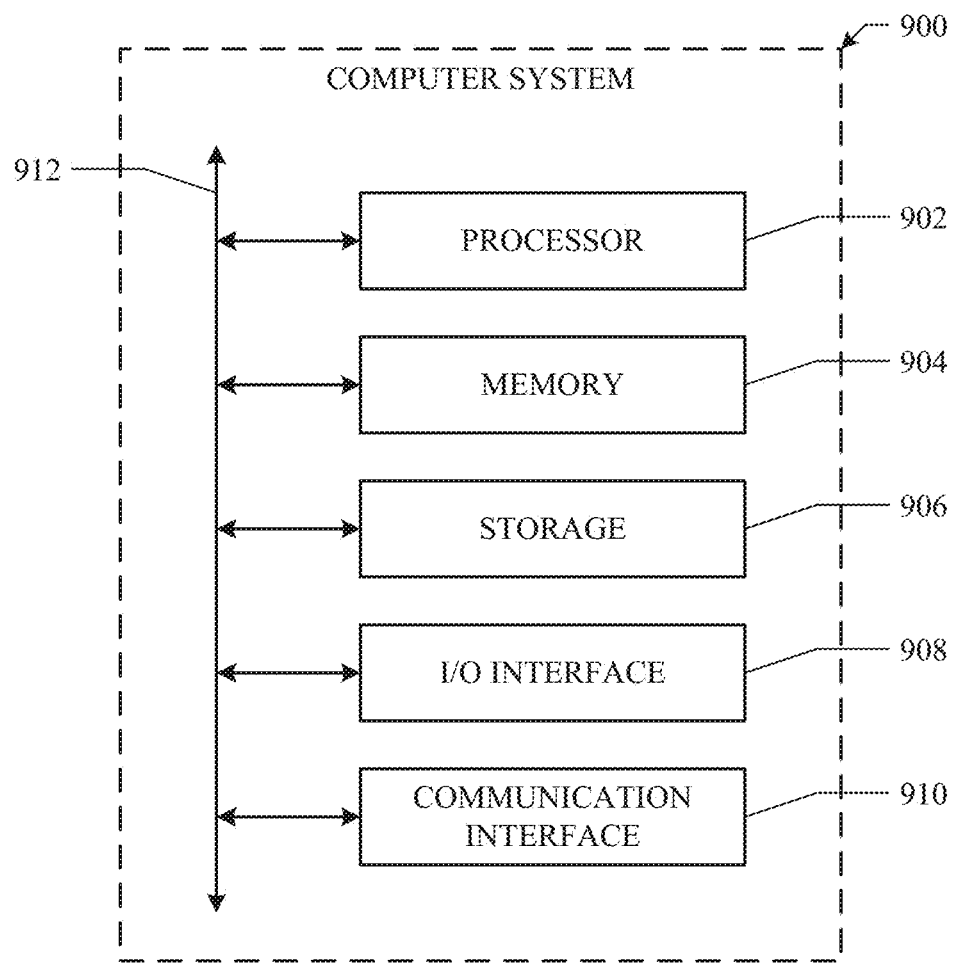
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900 ) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving, from a client system of a user of an online social network, a query inputted by the user;
   identifying a set of objects associated with the online social network matching the query;
   calculating, for each identified object, a plurality of category-scores corresponding to a plurality of categories, respectively, wherein each category-score is calculated based on a plurality of sub-scores corresponding to a plurality of scoring axes, respectively, each scoring axis corresponding to a particular factor associated with the respective scoring axis, and wherein each category-score is calculated based on a weighting of the plurality of sub-scores, the weighting for each sub-score being based on the category corresponding to the respective category-score;
   categorizing each identified object into a category of the plurality of categories based on the category-scores for the identified object, wherein each identified object is categorized into no more than one category of the plurality of categories; and
   sending, to the client system in response to the query, one or more search results corresponding to one or more of the categorized objects for display, each search result referencing the respective categorized object, wherein the one or more categorized objects of the search results comprises objects categorized into one or more selected categories, and wherein for each selected category one of the search results corresponds to a categorized object having a highest calculated category-score corresponding to the respective selected category.

2. The method of claim 1, wherein the weighting of the plurality of sub-scores for at least one category-score comprises a weighted arithmetic mean of the plurality of sub-scores.

3. The method of claim 1, wherein the plurality of categories comprises one or more of a news category, a celebrity category, a commentary category, a domain expert category, a review category, or a how-to category.

4. The method of claim 1, wherein for each identified object, the sub-score corresponding to at least one of the scoring axes is based on one of:
- a social-graph affinity of the user with respect to the identified object;
- a calculated text similarity between the identified object and the query;
- a recency value associated with the identified object;
- a calculated topic relevance for the identified object with respect to the query; or a calculated author quality associated with the identified object.

5. The method of claim 1, wherein the plurality of categories comprises one or more categories determined dynamically based on one or more topics associated with the identified objects.

6. The method of claim 1, wherein the plurality of categories comprises one or more categories determined dynamically based on a language-model analysis of the identified objects.

7. The method of claim 1, wherein the plurality of categories comprises one or more pre-determined categories.

8. The method of claim 1, wherein categorizing each identified object into a category of the plurality of categories is further based on a pre-filtering process.

9. The method of claim 1, wherein categorizing each identified object into a category of the plurality of categories is further based on a natural-language model analysis of the identified object.

10. The method of claim 1, further comprising adjusting the category-scores for one or more of the identified objects based on an author diversity among the categorized objects having the highest calculated category-scores.

11. The method of claim 1, wherein identifying the set of objects associated with the online social network matching the query comprises searching a plurality of verticals to identify a plurality of sub-sets of objects from the plurality of verticals, respectively, that match the search query.

12. The method of claim 11, wherein, for each selected category, the one or more search results categorized into the selected category comprise a set of blended search results, wherein the blended search results are generated by blending the plurality of sub-sets of identified objects from the plurality of verticals.

13. The method of claim 1, further comprising
receiving, from the client system, a request for additional search results associated with a particular category of the plurality of categories; and
sending, to the client system in response to the request, one or more search results corresponding to the particular category.

14. The method of claim 1, further comprising:
accessing a social graph comprising a plurality of nodes and a plurality of edges connecting the nodes, each of the edges between two of the nodes representing a single degree of separation between them, the nodes comprising:
- a first node corresponding to the user; and
- a plurality of second nodes corresponding to a plurality of objects associated with the online social network, respectively.

15. The method of claim 14, wherein the one or more selected categories are selected based on a degree of separation between the first node and a one or more second nodes associated with one or more of the selected categories.

16. The method of claim 14, wherein each category-score is calculated further based on a degree of separation between the first node and a second node corresponding to the identified object.

17. The method of claim 14, wherein, for each identified object, at least one sub-score is based on a degree of separation between the first node and a second node corresponding to the identified object.

18. The method of claim 1, furthering comprising, for each selected category, ranking the search results corresponding to the selected category based on the category-score for the categorized object corresponding to the search result.

19. One or more computer-readable non-transitory storage media embodying software that is operable when executed to:
receive, from a client system of a user of an online social network, a query inputted by the user;
identify a set of objects associated with the online social network matching the query;
calculate, for each identified object, a plurality of category-scores corresponding to a plurality of categories, respectively, wherein each category-score is calculated based on a plurality of sub-scores corresponding to a plurality of scoring axes, respectively, each scoring axis corresponding to a particular factor associated with the respective scoring axis, and wherein each category-score is calculated based on a weighting of the plurality of sub-scores, the weighting for each sub-score being based on the category corresponding to the respective category-score;
categorize each identified object into a category of the plurality of categories based on the category-scores for the identified object, wherein each identified object is categorized into no more than one category of the plurality of categories; and
send, to the client system in response to the query, one or more search results corresponding to one or more of the categorized objects for display, each search result referencing the respective categorized object, wherein the one or more categorized objects of the search results comprises objects categorized into one or more selected categories, and wherein for each selected category one of the search results corresponds to a categorized object having a highest calculated category-score corresponding to the respective selected category.

20. A system comprising: one or more processors; and a non-transitory memory coupled to the processors comprising instructions executable by the processors, the processors operable when executing the instructions to:
receive, from a client system of a user of an online social network, a query inputted by the user;
identify a set of objects associated with the online social network matching the query;
calculate, for each identified object, a plurality of category-scores corresponding to a plurality of categories, respectively, wherein each category-score is calculated based on a plurality of sub-scores corresponding to a plurality of scoring axes, respectively, each scoring axis corresponding to a particular factor associated with the respective scoring axis, and wherein each category-score is calculated based on a weighting of the plurality of sub-scores, the weighting for each sub-score being based on the category corresponding to the respective category-score;
categorize each identified object into a category of the plurality of categories based on the category-scores for the identified object, wherein each identified object is categorized into no more than one category of the plurality of categories; and send, to the client system in response to the query, one or more search results corresponding to one or more of the categorized objects for display, each search result referencing the respective categorized object, wherein the one or more categorized objects of the search results comprises objects categorized into one or more selected categories, and wherein for each selected category one of the search results corresponds to a categorized object having a highest calculated category-score corresponding to the respective selected category.

* * * * *